(12) United States Patent
Holland et al.

(10) Patent No.: US 6,446,096 B1
(45) Date of Patent: Sep. 3, 2002

(54) METHOD AND SYSTEM FOR PROVIDING DEVICE-SPECIFIC KEY CONTROL USING ROLE-BASED HTML ELEMENT TAGS

(75) Inventors: Ian Michael Holland, Austin, TX (US); Sandeep Kishan Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/152,156

(22) Filed: Sep. 11, 1998

(51) Int. Cl.[7] .............................................. G06F 17/21

(52) U.S. Cl. ....................................... 707/513; 345/760

(58) Field of Search ................................ 707/501, 513, 707/526, 501.1; 345/326, 329, 342, 348, 760

(56) References Cited

U.S. PATENT DOCUMENTS

| | | | | |
|---|---|---|---|---|
| 5,673,322 A | | 9/1997 | Pepe et al. ..................... 705/52 |
| 5,727,159 A | * | 3/1998 | Kikinis ........................ 709/246 |
| 5,732,074 A | | 3/1998 | Spaur et al. .................. 370/313 |
| 5,812,131 A | * | 9/1998 | Bertram ....................... 345/339 |
| 5,905,486 A | * | 5/1999 | Brittenham et al. ......... 345/157 |
| 5,930,341 A | * | 7/1999 | Cardillo, IV et al. ..... 379/93.25 |
| 6,018,710 A | * | 1/2000 | Wynblatt et al. ........... 704/260 |

\* cited by examiner

*Primary Examiner*—Stephen S. Hong
(74) *Attorney, Agent, or Firm*—A. Bruce Clay; Carstens, Yee & Cahoon LLP

(57) ABSTRACT

Content developers author Web content that is both appropriate for a desktop machine having a mouse and a keyboard and for client devices having alternative user input hardware. This content is capable of being received by the client browser and interpreted according to the local user input capabilities, whether they be a standard keyboard and mouse, numeric keypad, pen, or other input device.

57 Claims, 8 Drawing Sheets

```
<HTML>
<HEAD>
    <TITLE>Simple HTML Form</TITLE>
</HEAD>
<BODY>
Type in a URL:
<FORM>
    <INPUT TYPE=TEXT NAME="Textbox" SIZE=25>    — 300
    <BR>
    <BR>
    <INPUT TYPE=BUTTON VALUE="Load" onClick="document.location=this.form.Textbox.value">    — 305
</FORM>
</BODY>
</HTML>
```

305
315
308
310

350
355

FIG. 5A
```
<HTML>
<HEAD>
    <TITLE>Simple HTML  Form</HTML>
</HEAD>
<BODY>
Type in a URL:
<FORM>
    <INPUT TYPE=TEXT NAME="Textbox" SIZE=25>
    <BR>
    <BR>
    <INPUT TYPE=BUTTON VALUE="Load" onClick="document.location=this.form.Textbox.value" role="Accept">
</FORM>
</BODY>
</HTML>
```
505
525
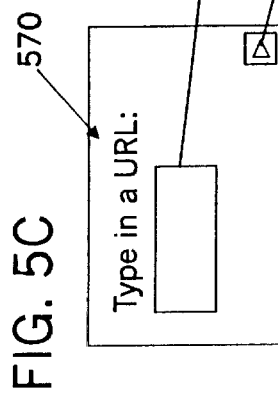
FIG. 5B
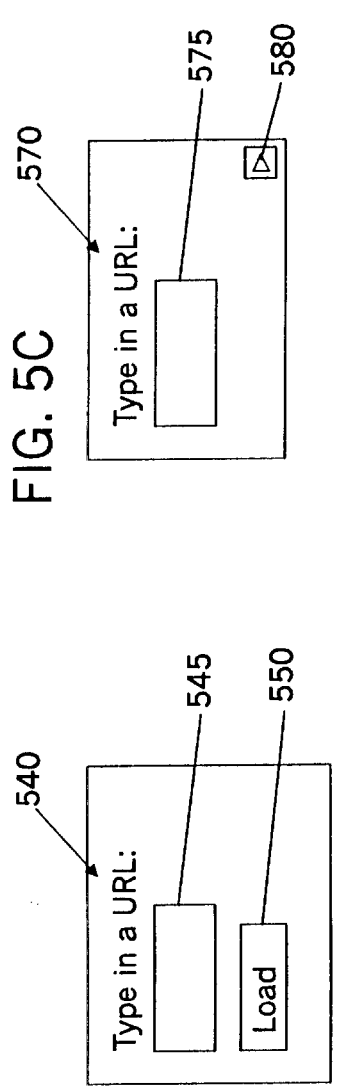
FIG. 5C

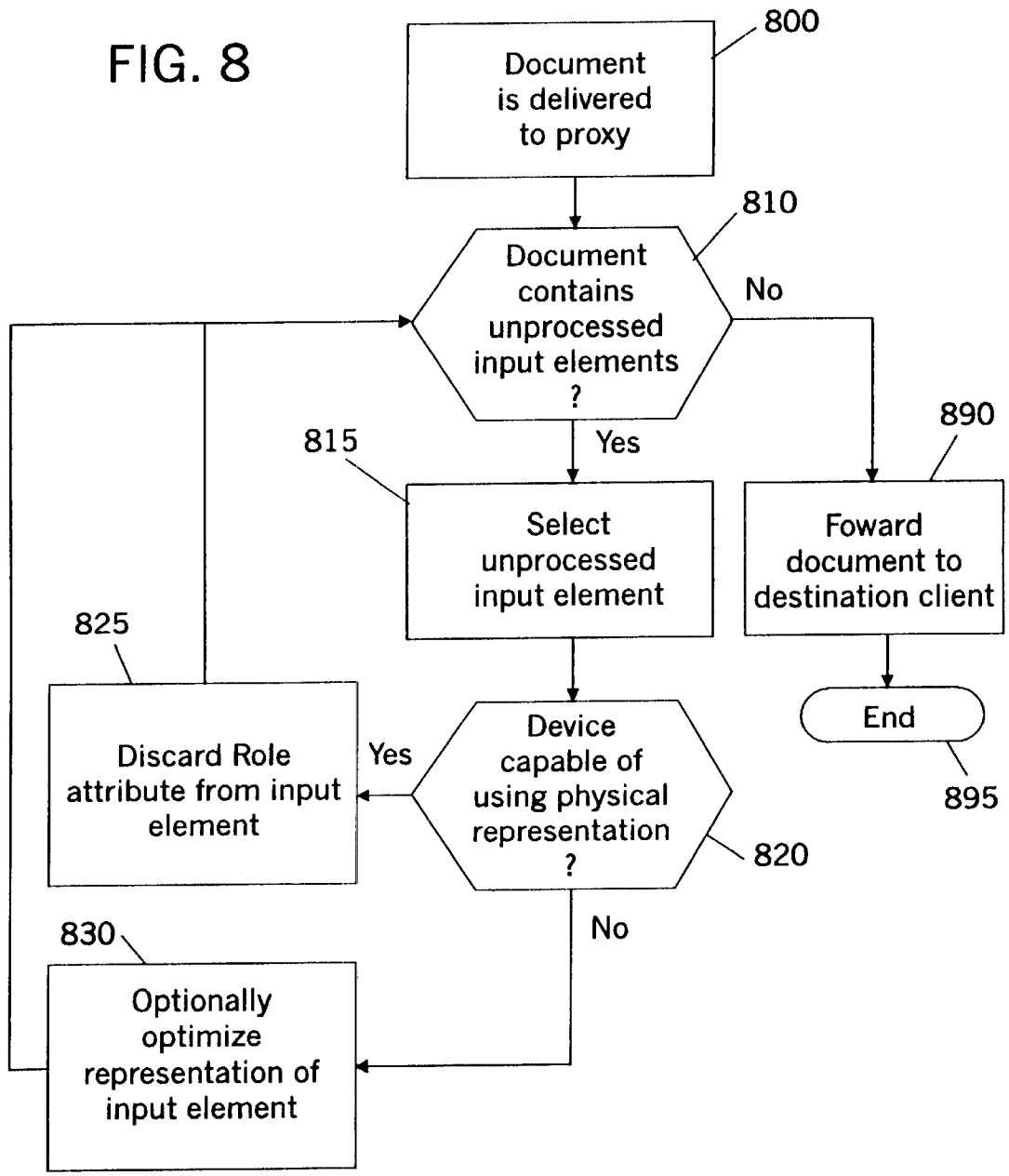

METHOD AND SYSTEM FOR PROVIDING DEVICE-SPECIFIC KEY CONTROL USING ROLE-BASED HTML ELEMENT TAGS

FIELD OF THE INVENTION

This invention relates in general to computer software, and in particular to a method and system for describing a user interface in a manner that is independent of the physical capabilities of the device that is displaying the software application. More particularly, the present invention relates to a method and system by which users may interact with Hyper-Text Markup Language (HTML) documents from devices having limited capabilities.

BACKGROUND OF THE INVENTION

World-Wide Web browsers are traditionally executed on desktop machines having sophisticated user input devices. For example, most desktop machines allow a user to interact with the browser using a keyboard and mouse. Accordingly, the Hyper-Text Markup Language (HTML) used to author most Web documents has evolved to support rich interactions between the user and the document content. For example, modem HTML documents may contain push buttons, text entry fields, check boxes, and other user interface widgets. To access these widgets, the user must have access to the input devices (keyboard and mouse) available on the desktop machines that typically render those documents.

However, this user interface model is inappropriate for Web browsers that execute on limited-capability devices such as cellular telephones, pagers, and palmtop computers (such as the WORKPAD, a trademark of IBM Corp.). These devices generally have neither a keyboard nor a mouse, and therefore, they cannot handle user interactions in the same way as a desktop machine. Instead, these small devices have their own set of unique user input controls, including numeric button keypads, electronic pens, and voice.

As an example, consider a cellular telephone that attempts to display an HTML page containing two buttons respectively labeled "OK" and "Cancel." The buttons might be displayed as small icons on the cellular phone display. However, the user has no way to directly interact with those HTML buttons because there is no mouse or other pointing device. Instead, the phone must allow the user to interact with the "OK" and "Cancel" functions through the physical keypad on the phone's handset. To do this, the phone must have enough information to associate the "OK" and "Cancel" buttons in the HTML document with the most appropriate physical keys for the end-user. If the wrong physical keys are chosen by the phone, then the user will be faced with an unnatural interface experience.

To enable this functionality, various designers have defined new Web document languages that explicitly describe the purpose of each user interface element. One such language, the Wireless Markup Language (WML) produced by the Wireless Application Protocol (WAP) Forum, describes user interface events as abstract "actions" that have a well-known purpose. The client device, upon receiving the WML document can interpret the purpose of each user interface event to determine which physical key to associate with that event.

However, the introduction of WML and other related markup languages introduces the need for Web content developers to maintain multiple independent versions of their content, one for desktop machines that can render HTML (with its assumptions of powerful input devices) and one for small devices that can render WML (with its assumptions of non-traditional input devices). Maintaining multiple versions of content represents a significant cost to content developers who must learn two independent markup languages, invest in multiple authoring tools, and ensure that both versions remain consistent with each other over time.

Therefore, a need exists for a method and system that allows content developers to author Web content that is both appropriate for a desktop machine having a mouse and a keyboard and for client devices having alternative user input hardware. This content should be capable of being received by the client browser and interpreted according to the local user input capabilities, whether they be a standard keyboard and mouse, numeric keypad, pen, or other input device.

SUMMARY OF THE INVENTION

An object of the present invention is to provide, within a networked environment, a method for authoring Web documents that may be delivered to client browsers on devices having heterogeneous user input capabilities.

Another object of the present invention is to enable client browsers to present Web documents to their users in a manner that is consistent with the locally available user input capabilities.

Yet another object of the present invention is to enable content developers to author only one version of their Web documents, though the document may be transformed or interpreted in a manner that is consistent with the requesting device's user input capabilities.

To achieve the foregoing objects and in accordance with the purpose of the invention as broadly described herein, a method and system are disclosed for embedding inside an HTML document information about the purpose of specified user interface events. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 5A, 5B, and 5C illustrate an HTML document that has been annotated with logical user interface information, in accordance with the present invention;

FIG. 8 is a flowchart showing how an annotated HTML document is processed by a proxy server, in accordance with the present invention.

DETAILED DESCRIPTION OF THE INVENTION

Figure 1:
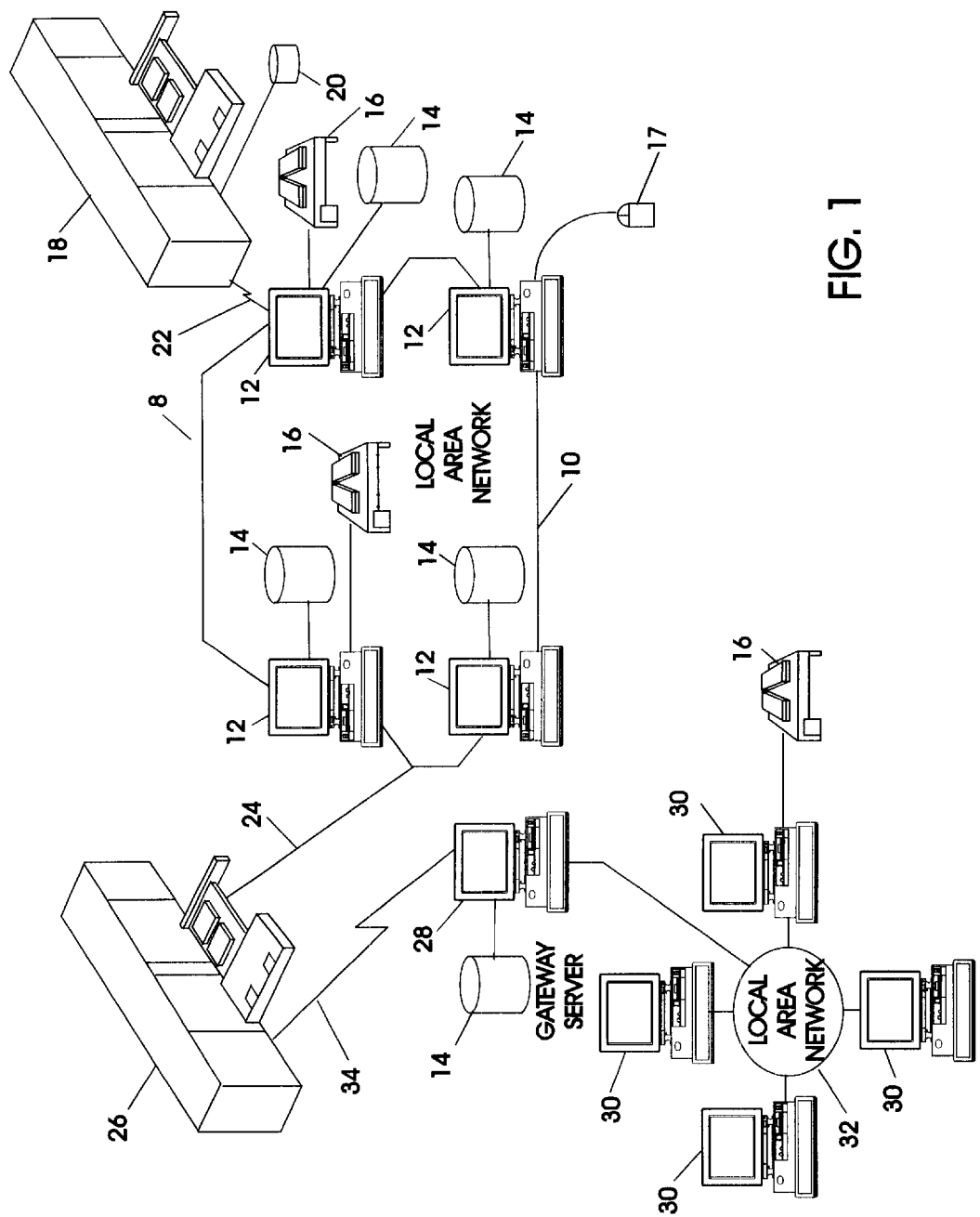
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
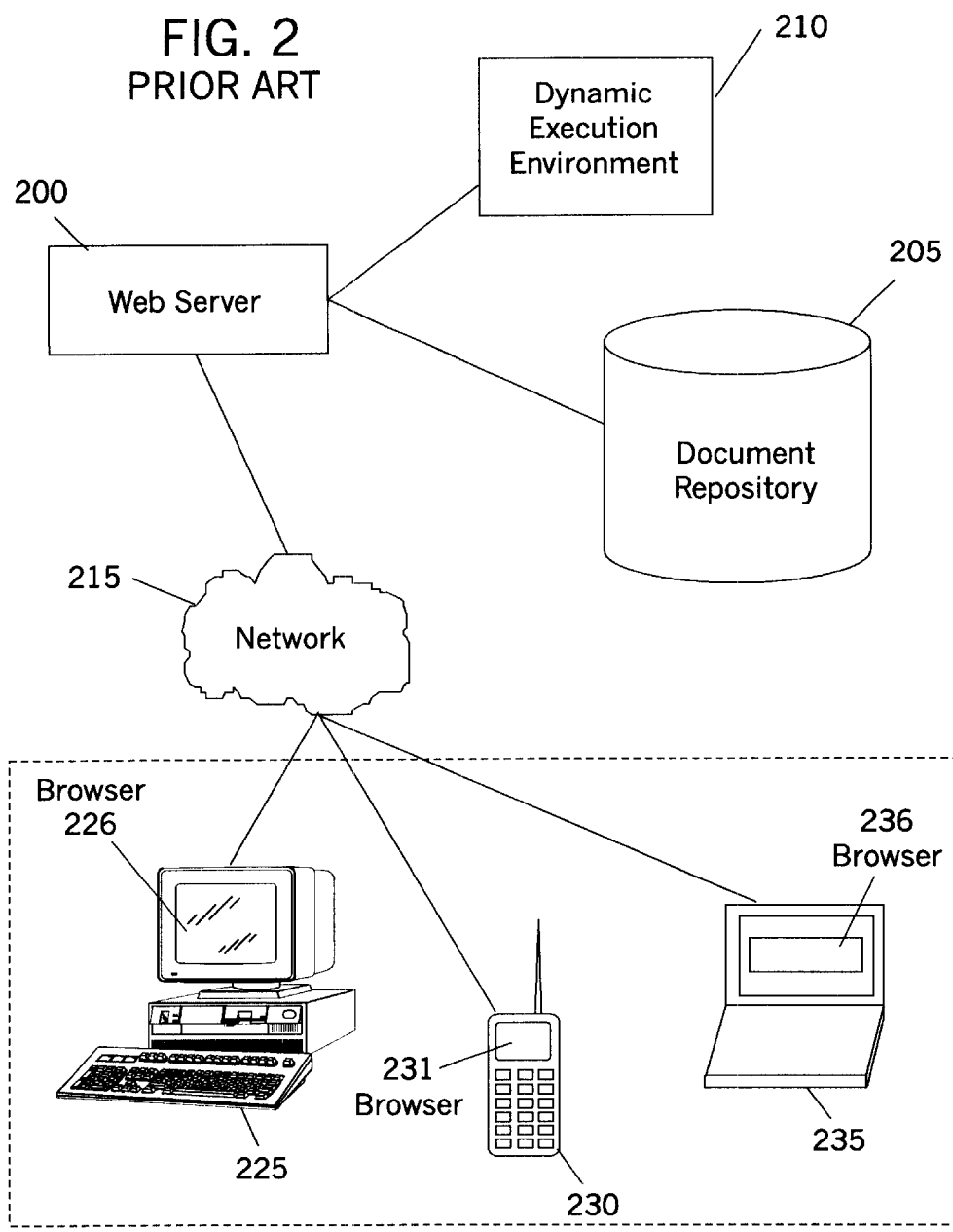
FIG. 2 illustrates a client-server environment for delivering Web documents to clients having heterogeneous user input capabilities, in accordance with the prior art.

Referring now to FIG. 2, an example is shown of a prior art network infrastructure for delivering Web content to devices having heterogeneous user input capabilities. A Web Server 200 is coupled to a Document Repository 205 which may be stored in a filesystem, database, or other data store. Alternatively or additionally, the Web Server 200 may include a Dynamic Execution Environment 210 through which Web documents may be generated dynamically in response to a client request. Examples of such dynamic execution environments include Common Gateway Interface (CGI) scripts or programs, Java servlets or MICROSOFT ACTIVE SERVER PAGES (trademark of Microsoft Corp.). In addition, the Web Server 200 is coupled to a Network 215 over which it receives client requests for Web documents and over which those Web documents are transmitted to the requesting client. The Network 215 may include any combination of connected (e.g. wire-line) communications or disconnected (e.g. wireless, infrared, radio, or satellite) transmission media.

The Web Server 200 receives requests from a plurality of clients, designated collectively by reference numeral 220. A desktop client 225 may have a mouse and/or keyboard for supporting user input. On the other hand, a cellular telephone 230 may only have a numeric keypad for supporting user input. A palm-sized computer 235 may use a pen or stylus for user input. It is to be understood that although not shown, there may be a wide range of client devices, each having a different set of user input metaphors. FIG. 2 shows only a representative sample of this range of possible devices. Each client device includes a Browser 226, 231, and 236, respectively, that is capable of receiving Web documents, interpreting the Web document, presenting the Web document to the local user, and receiving and processing user input.

Continuing with FIG. 2, a client device transmits a request over Network 215 for Web content from the Web Server 200. Depending on the Uniform Resource Locator (URL) contained in the request, the Web Server 200 may retrieve the content from the static data store Document Repository 205 or invoke a program in the Dynamic Execution Environment 210. The content (either static or dynamic) is transmitted by the Web Server 200 over Network 215 to the requesting client 225, 230, or 235 which delivers the document to the appropriate resident Browser 226, 231, or 236.

The most common type of Web document is authored in HTML, the Hyper-Text Markup Language. HTML documents may optionally contain embedded executable code written in JavaScript, Visual Basic, or another scripting language for execution in the client's browser. Through the combination of HTML and JavaScript, a Web document may present a rich user interface including buttons, check boxes, menus, text fields, etc.

Figures 3A, 3B:
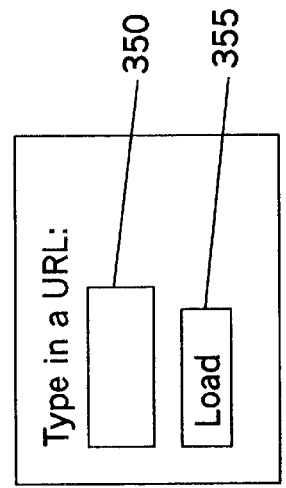
FIGS. 3A and 3B illustrate an HTML document containing a plurality of user input controls, in accordance with the prior art.

Referring now to FIG. 3A, we see an example of an HTML document containing a simple form including two user input widgets, namely a text input field and a button. When rendered on a desktop Web browser, the output is as shown in FIG. 3B. The HTML document contains two INPUT tags 300 and 305, each customized using multiple defined attributes. The INPUT tag 300 is designated as type "TEXT", meaning that it should be represented as a text input field 350 (see FIG. 3B). The other INPUT tag 305 is designated as type "BUTTON," meaning that it should be visually represented as a push button 355 (see FIG. 3B) on the display; the "Value" attribute 308 in the INPUT tag 305 designates what text (e.g. "Load") should be rendered on the button face. The desktop browser accepts keyboard input into the text field 350, and the user may click the mouse on the push button 355 to activate it. The "onClick" attribute 310 of the INPUT tag 305 contains JavaScript code, generally identified by reference numeral 315, describing what action should be taken when the push button 355 is pressed. In this example, the JavaScript code 315 instructs the browser to retrieve the URL typed into the text field 350. It is to be understood that alternative HTML documents may employ another scripting language, such as, for example, Microsoft's Visual Basic or Sun's Java, for scripting the behavior of user interface elements. Moreover, though not shown, it is to be understood that HTML supports a variety of other INPUT types including "submit" a button that posts a form, "checkbox" for a check box, and "radio" for a radio button. These options are all well-documented in the prior art.

A significant limitation of the prior art lies in its explicit specification of the physical embodiment of each user interface (text field, button, etc.) and, therefore, its assumptions of a rich set of user input devices such as a mouse and keyboard. For instance, to interact with the HTML document of FIG. 3B, the user must be able to type into the text field 350, and the user must be able to click on the push button 355 using a mouse. Specialized browsers such as Lynx can enable the display and interaction with such an HTML document on a text-only display, but the user is still presumed to have at least a full-function keyboard for navigating among and manipulating the user interface elements.

To address these limitations of HTML on devices having limited user input devices, alternative markup languages have been developed. The Wireless Markup Language (WML) developed by the WAP (Wireless Application Protocol) Forum and HDML (Handheld Device Markup Language) developed by Unwired Planet are examples of such specialized content formats. These markups allow user interactions to be described in terms of a logical embodiment so that the rendering device can dynamically determine the best manner for visually representing those interfaces and the best manner for physically supporting those user interactions given the available user input devices.

Figure 4A:
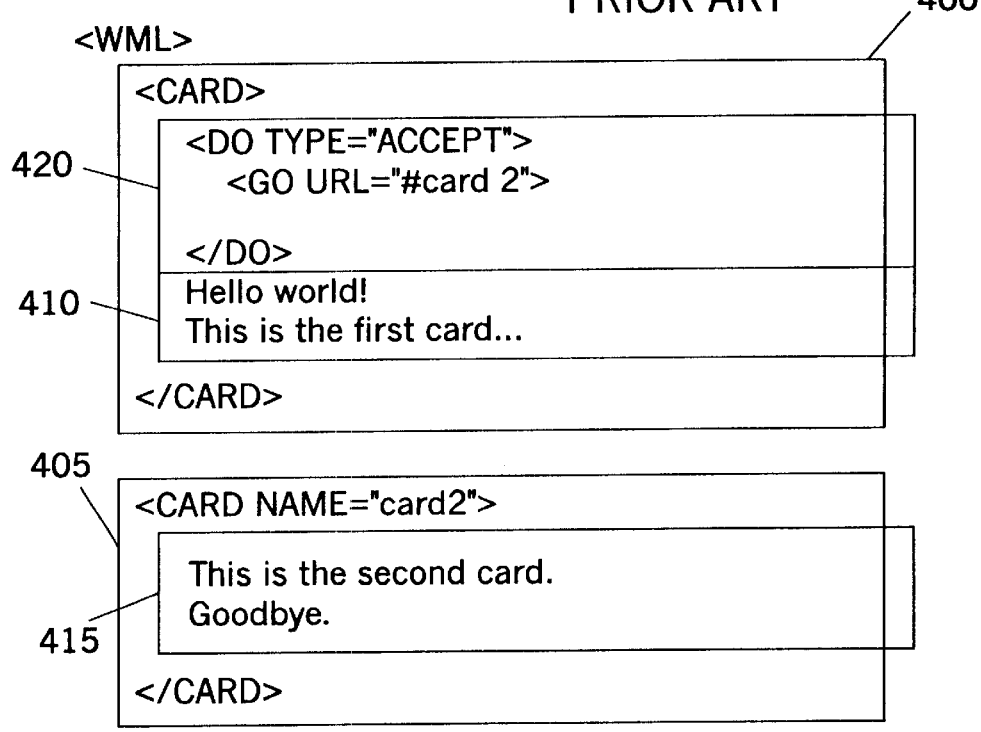
FIGS. 4A and 4B illustrate a WML document containing a logical user interface control, in accordance with the prior art.

Referring now to FIG. 4A, an example is shown of a document authored in the Wireless Markup Language (WML). WML documents are structured into sections, called "cards," which are suitable for display on a small-screen device. The WML document shown comprises a first card 400 and a second card 405 each of which contains some displayable text 410 and 415, respectively. To support user interactions, a card may optionally contain a "DO" tag block 420 which describes the action that should be taken in response to a particular user interaction. For example, the "DO" tag block 420 instructs the browser that when the user takes action to Accept the current card, the browser should retrieve and display a card designated by the URL "#card2", which is the second card 405.

Figure 4B:
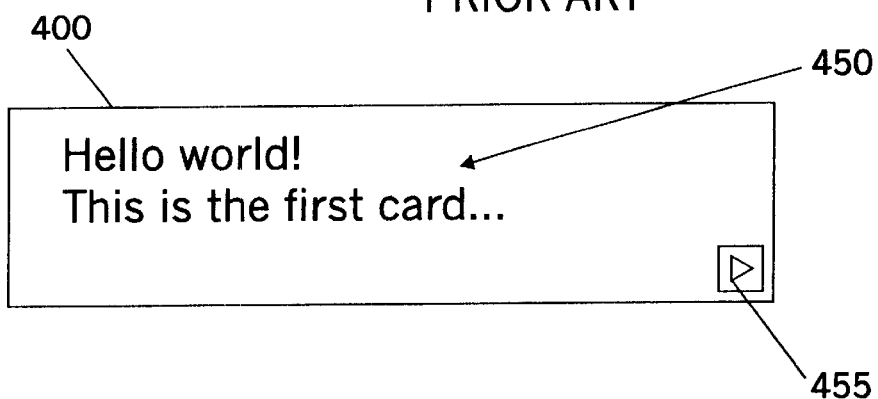

The WML document in FIG. 4A does not describe how the user should actually interact with the browser to Accept the current card. The "Accept" action is therefore a "logical" user interface. Different browsers may support such actions in different ways according to the user input capabilities of the client hardware. For example, referring to FIG. 4B, there is shown one possible display of the first card 400. Beneath text 450, a small arrow 455 is shown to indicate that the user may press the "OK" button on the cellular phone to proceed further. The "OK" button therefore represents the physical manifestation of the logical "Accept" action, and the arrow 455 is the visual indication that the "Accept" action is currently active. Depending on the device, a different physical action may be required to perform the "Accept" action. It is to be understood that the representation shown in FIG. 4B is, therefore, only one of many possible representations of the document shown in FIG. 4A. It is also to be understood that in WML, several user actions may be present on a single page, including "Accept," "Prev," "Help," "Reset," "Options," and "Delete."

The development of markup languages such as WML implies that Web content must be separately authored in both HTML and WML if it is to be available both to devices having a rich user interface and to devices having a limited user interface. For example, the HTML document describes the visual and physical manifestations of the user interface without specifying the logical role of the interface; on the other hand, the WML document describes the logical manifestation of the user interface without specifying its visual and physical representation. This dual-authoring represents a significant burden to content authors and to Web site managers. Therefore, it is desirable to have a scheme for authoring a single document that can be presented on a full range of client devices. Though this common authoring is imminently desirable, its implementation has heretofore been non-obvious, as evidenced by the emergence of divergent content authoring languages for the different types of client devices.

Referring now to FIG. 5A, the same HTML document from FIG. 3A is shown, except that an INPUT button tag 505 is augmented with an additional "Role" attribute 525. This "Role" attribute 525 describes the logical purpose for the button element in the document. Because an HTML browser is expected to simply ignore tags and attributes that it does not recognize, a standard HTML browser on a full-function client machine would simply ignore the "Role" attribute 525. The result would be the expected display shown in FIG. 5B, which contains text 540, input field 545, and button 550. On the other hand, a browser located on a client machine having limited user input capabilities can be augmented to recognize the "Role" attribute 525 and therefore enable the user to initiate a button press event by taking actions appropriate to the particular input device. For example, the display in FIG. 5C shows a representation of this HTML document on a limited-function user interface. Text 570 is displayed along with an input field 575 and a small arrow 580 (similar to the one shown in FIG. 4B). The arrow 580 indicates that an Accept action is valid, and the user can press the "OK" button on the cellular phone to take that action.

As with the representation of the WML page in FIG. 4A, it is to be understood that different browsers may represent the availability of the "Accept" action using a variety of visual indicators and support that action through a variety of physical interaction paradigms (depending on the user input capabilities of the client device). It is also to be understood that several Roles may be represented for buttons on a single page, including "Accept," "Prev," "Help," "Reset," "Options," and "Delete." It is also to be understood that although the "Role" keyword is used in preferred embodiments to describe the logical purpose of the input element, alternative implementations may convey the information using a different attribute name which is understood by the client browser. Finally, it is to be understood that although preferred embodiments of the present invention implement the "Role" attribute within HTML documents, alternative embodiments may employ other markup languages, including WML or any of a variety of XML (eXtensible Markup Language) document types. The essential element is the dual specification of physical and logical representations of the input element.

The "Role" attribute may be defined for HTML INPUT elements having different Type attributes (and therefore having different visual and physical specifications). As discussed previously, elements of Type="button" may have a variety of roles including "Accept," "Prev," "Help," "Reset," "Options," and "Delete." For example, an INPUT tag of Type="radio" creates a radio button on a graphical browser; the user is expected to click his mouse on this button to select it. To support alternative visual representations and interaction representations, the INPUT tag may include a "Role" attribute such as "Option1", "Option2", etc. or "OptionA", "OptionF", etc. that give a hint about what keys or signals might be used by alternative representations. Similar "Role" values may be assigned to INPUT elements of Type="checkbox" (that, on a standard browser, create a checkbox that the user selects and de-selects by clicking his mouse) and OPTION elements in a SELECT group (that, on a standard browser, create a pop-up menu from which the user selects one or more of the available options by use of mouse and keyboard).

When a browser on a limited-function client receives an HTML document containing input elements, it must determine which elements may be rendered using their suggested physical representation (e.g. button, checkbox, text field, etc.) according to the available user input capabilities of the device. If the element cannot be adequately represented using the physical representation suggested by the HTML document, then the browser selects an alternative visual, aural, or other representation that conveys the logical behavior of the input element in accordance with the available user input capabilities of the client.

For example, upon encountering an input element of "Type='BUTTON'" in the HTML document, the browser renders a button on the display if the user has access to a mouse or stylus or full-function keyboard. However, if the user is unable to select the button, then the browser optionally displays an icon and associates the button with a particular key on the device's keypad. Alternatively, if the device has no keypad, the browser may allow the user to speak the "Role" to designate activation of the button input element.

Figure 6:
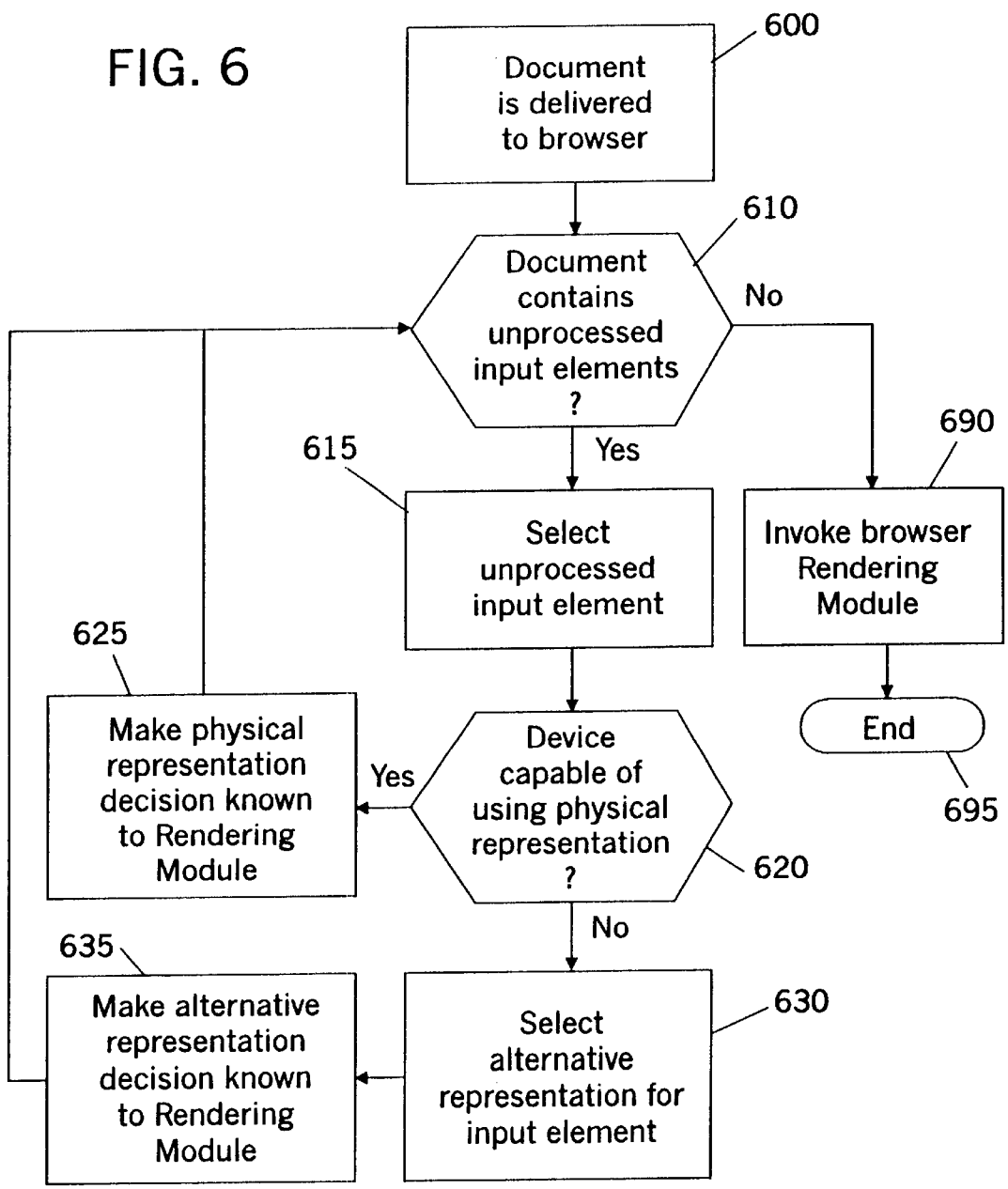
FIG. 6 is a flowchart showing how an annotated HTML document is processed by a browser, in accordance with the present invention.

Referring now to FIG. 6, there is shown a flowchart depicting the general steps required to process an HTML document whose input elements have been augmented by "Roles." At block 600, the document is delivered to the browser. At decision block 610, it is determined whether the document contains any unprocessed input elements. If the answer to decision block 610 is no, then control passes to block 690 and the browser's Rendering Module is invoked. The process then terminates at block 695. Otherwise, if the answer to decision block 610 is yes, then at block 615, an unprocessed input element is selected from the document. At decision block 620, it is determined whether the device is capable of representing the input element using the physical embodiment described in the HTML document. This determination is made by assessing the device's user input capabilities against the input element type. If the answer to decision block 620 is yes, then at block 625, the use of the physical representation is made available to the browser's Rendering Module and control returns to decision block 610.

Continuing with FIG. 6, if the answer to decision block 620 is no, then it is determined that the input element must be represented using an alternative representation based on its logical Role. At block 630, the appropriate alternative representation is selected based on an assessment of the device's user input capabilities and the specified Role of the input element. Besides specifying how the user will interact with the input element, this alternative representation may include an optional visual or aural representation. At block 635, the use of the alternative representation is made known to the browser's Rendering Module and control returns to decision block 610.

Although not shown in FIG. 6, implementations of this invention may not (and likely will not) support both physical and alternative representations of a particular input element. Within a browser implementation, each input element therefore will be supported by either a physical or alternative representation in accordance with the device on which the browser is deployed.

In preferred embodiments, the HTML document with additional Role attributes is delivered directly to the client browser. However, in alternative embodiments, the HTML document may be manipulated by a proxy server before being delivered to the client browser. For example, if the client has a rich set of user input devices and, therefore, can render one or more of the input elements visually, then there is no need for the browser to receive the Role attributes for those one or more input elements in the document. By eliminating these extra Role attributes, the proxy saves network bandwidth by delivering a smaller document. The client browser effectively sees standard HTML tags for those input elements that it can represent using standard techniques. Alternatively, when the document is being delivered to a browser that cannot represent one or more input tags using their standard visual representations, a proxy server may optimize the description of those tags to highlight the Role information. This optimization may include, for example, replacing the HTML tags with their corresponding WML tags.

Figure 7:
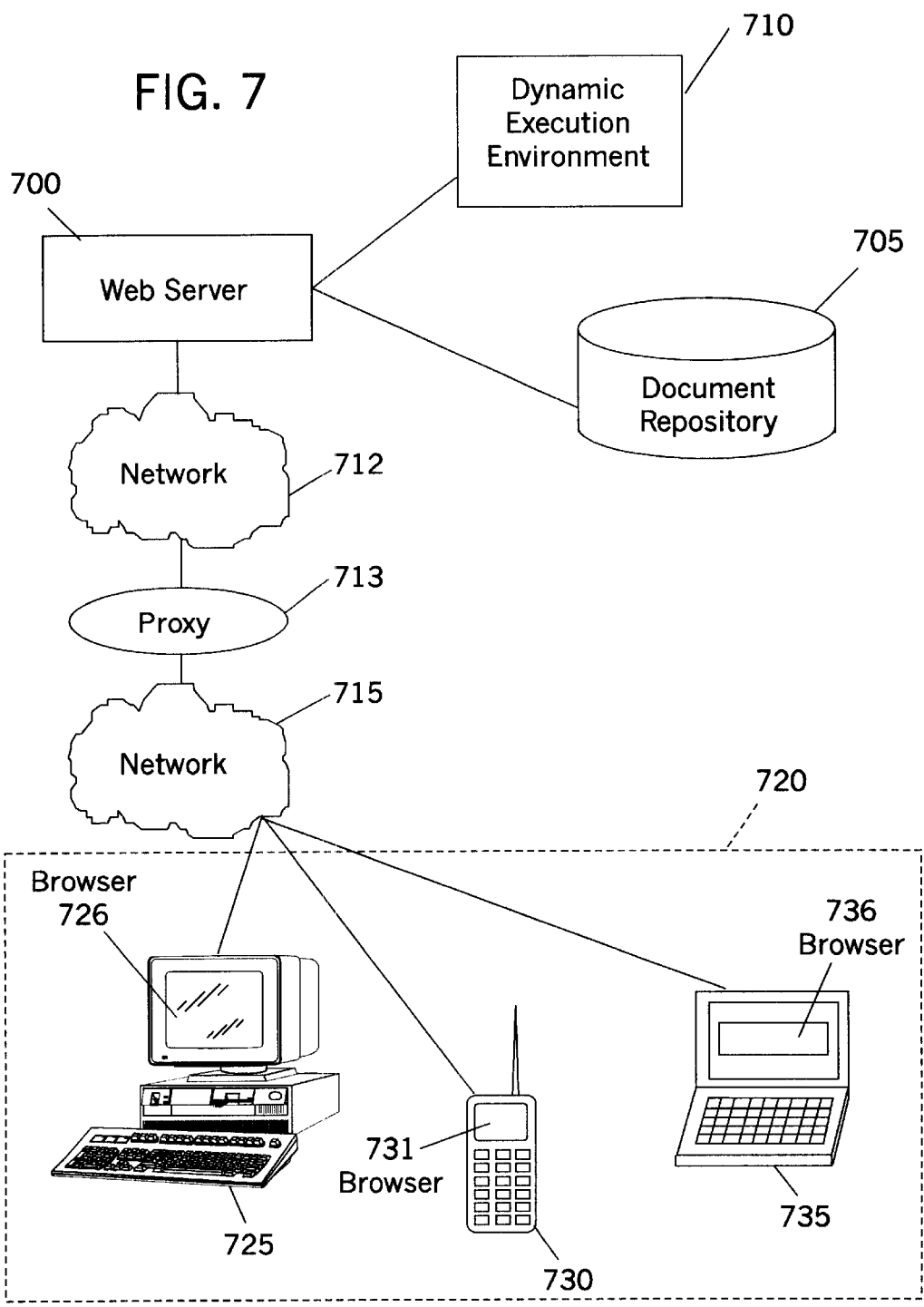
FIG. 7 illustrates a client-server environment containing a proxy server for delivering Web documents to clients having heterogeneous user input capabilities.

Referring now to FIG. 7, there is shown a network infrastructure for delivering Web content via such a proxy server. The infrastructure is identical to that shown in FIG. 2, except for the introduction of a Proxy server 713 that is coupled to an intermediary Network 712. Documents returned by the Web Server 700 pass over Network 712 before arriving at the Proxy server 713. After processing the document and optionally altering its content, the resulting document is delivered over Network 715 to a range of client devices, designated collectively by reference numeral 720. The remaining components of the Web Server 700 and the client devices 720 are identical to those shown in FIG. 2 and will not be discussed further. Though not shown, it is understood that Proxy server 713 may be physically co-located with the Web Server 700, effectively removing the need for Network 712. Moreover, alternative implementations may implement the Proxy server 713 as an application that executes within the Dynamic Execution Environment 710 coupled to Web Server 700.

Referring now to FIG. 8, there is shown a flowchart depicting the general steps employed by a proxy server to process an HTML document whose input elements have been augmented by "Role" information. At block 800, the document is delivered to the proxy. At decision block 810, it is determined whether the document contains any unprocessed input elements. If the answer to decision block 810 is no, then control passes to block 890, where the modified document is forwarded to the destination browser. The process then terminates at block 895. Otherwise, if the answer to decision block 810 is yes, then at block 815, an unprocessed input element is selected from the document. At decision block 820, it is determined whether the destination device is capable of representing the input element using the physical embodiment described in the HTML document. This determination is made by assessing the device's user input capabilities against the input element type. If the answer to decision block 820 is yes, then at block 825, the Role information is removed from the document and control returns to decision block 810.

Continuing with FIG. 8, if the answer to decision block 820 is no, then it is determined that the client must represent the input element using an alternative representation based on its logical Role. At block 830, the input element is optionally replaced with an optimized representation such as a WML tag. Control then returns to decision block 810. In this way, both physical and logical information about each input element are made available, but the proxy determines which type of information is most appropriate for the client device.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. In a networked environment, a method of creating a document for delivery over the World-Wide Web, wherein the document contains a plurality of input elements requiring user interaction, comprising the steps of:

describing each of the plurality of input elements as a visual embodiment thereof; and describing each of the plurality of input elements as a logical purpose thereof.

2. The method of claim 1, wherein said document is authored in an eXtensible Markup Language (XML) format.

3. The method of claim 2, wherein said step of describing each of the plurality of input elements as a logical purpose thereof comprises describing each of the plurality of input elements as an attribute thereof.

4. The method of claim 1, wherein said document is authored using the HyperText Markup Language (HTML).

5. The method of claim 4, wherein said step of describing each of the plurality of input elements as a logical purpose thereof comprises describing each of the plurality of input elements as an attribute thereof.

6. The method of claim 4, wherein said visual embodiment is of type "button".

7. The method of claim 4, wherein said visual embodiment is of type "checkbox".

8. The method of claim 4, wherein said visual embodiment is of type "radio".

9. The method of claim 4, wherein said visual embodiment is of type "option".

10. The method of claim 1, wherein said step of selecting an alternative embodiment comprises assessing said logical purpose of said one of the plurality of input elements and said user input capabilities of said client.

11. In a networked environment, a method of creating a document for delivery over the World-Wide Web, wherein the document contains a plurality of input elements requiring user interaction, comprising the steps of:

describing each of the plurality of input elements as a visual embodiment thereof; and describing each of the plurality of input elements as a logical embodiment thereof, wherein said step of describing each of the plurality of input elements as a logical embodiment thereof comprises describing each of the plurality of input elements as an attribute thereof, and wherein said attribute is named "Role".

12. In a networked environment, a method of creating a document for delivery over the World-Wide Web, wherein the document contains a plurality of input elements requiring user interaction, comprising the steps of:

describing each of the plurality of input elements as a visual embodiment thereof; and describing each of the plurality of input elements as a logical embodiment thereof, wherein said document is authored using the HyperText Markup Language (HTML), wherein said step of describing each of the plurality of input elements as an attribute thereof, and wherein said attribute is named "Role".

13. In a networked environment, a method of creating a document for delivery over the World-Wide Web, wherein the document contains a plurality of input elements requiring user interaction, comprising the steps of:

describing each of the plurality of input elements as a visual embodiment thereof; and describing each of the plurality of input elements as a logical embodiment thereof, wherein the document is received by a proxy server before being delivered to a Web browser that is executing on a client and wherein the processing of said document by said proxy server comprises the steps of:

selecting one of said input elements for processing;

evaluating the user input capabilities of said client;

determining whether said client is capable of supporting said visual embodiment of said one of said input elements;

deleting information about said logical embodiment of said one of said input elements from said document if said step of determining indicates that the client is capable of supporting said visual embodiment of said one of said input elements; and forwarding said document as modified by said step of deleting to said browser that is executing on a client.

14. The method of claim 13, further comprising the step of replacing a description of said one of the plurality of input elements with an alternative description if said step of determining indicates that said client is not capable of supporting said visual embodiment of said one of the plurality of input elements.

15. The method of claim 14, wherein said alternative description is a WML tag.

16. In a networked environment, a system for creating a document for delivery over the World-Wide Web, wherein the document contains a plurality of input elements requiring user interaction, comprising:

means for describing each of the plurality of input elements as a visual embodiment thereof; and means for describing each of the plurality of input elements as a logical purpose thereof.

17. The system of claim 16, wherein said document is authored in an eXtensible Markup Language (XML) format.

18. The system of claim 17, wherein said means for describing each of the plurality of input elements as a logical purpose thereof comprises means for describing each of the plurality of input elements as an attribute thereof.

19. The system of claim 16, wherein said document is authored using the HyperText Markup Language (HTML).

20. The system of claim 19, wherein said means for describing each of the plurality of input elements as a logical purpose thereof comprises means for describing each of the plurality of input elements as an attribute thereof.

21. The system of claim 19, wherein said visual embodiment is of type "button".

22. The system of claim 19, wherein said visual embodiment is of type "checkbox".

23. The system of claim 19, wherein said visual embodiment is of type "radio".

24. The system of claim 19, wherein said visual embodiment is of type "option."

25. The system of claim 16, wherein said means for selecting an alternative embodiment comprises means for assessing said logical purpose of said one of the plurality of input elements and said user input capabilities of said client.

26. In a networked environment, a system for creating a document for delivery over the World-Wide Web, wherein the document contains a plurality of input elements requiring user interaction, comprising:

means for describing each of the plurality of input elements as a visual embodiment thereof; and means for describing each of the plurality of input elements as a logical embodiment thereof, wherein said document is authored in an Extensible Markup Language (XML) format, wherein said means for describing each of the plurality of input elements as a logical embodiment thereof comprises means for describing each of the plurality of input elements as an attribute thereof, and wherein said attribute is named "Role".

27. In a networked environment, a system for creating a document for delivery over the World-Wide Web, wherein the document contains a plurality of input elements requiring user interaction, comprising:

means for describing each of the plurality of input elements as a visual embodiment thereof: and means for describing each of the plurality of input elements as a logical embodiment thereof, wherein said document is authored using the HyperText Markup Language (HTML), wherein said means for describing each of the plurality of input elements as a logical embodiment thereof comprises means for describing each of the plurality of input elements as an attribute thereof, and wherein said attribute is named "Role".

28. In a networked environment, a system for creating a document for delivery over the World-Wide Web, wherein the document contains a plurality of input elements requiring user interaction, comprising:

means for describing each of the plurality of input elements as a visual embodiment thereof; and means for describing each of the plurality of input elements as a logical embodiment thereof, wherein the document is received by a proxy server before being delivered to a Web browser that is executing on a client and wherein the processing of said document by said proxy server comprises:

means for selecting one of said input elements for processing;

means for evaluating the user input capabilities of said client;

means for determining whether said client is capable of supporting said visual embodiment of said one of said input elements;

means for deleting information about said logical embodiment of said one of said input elements from said document if said means for determining indicates that the client is capable of supporting said visual embodiment of said one of said input elements; and means for forwarding said document as modified by said means for deleting to said browser that is executing on a client.

29. The system of claim 28, further comprising means for replacing a description of said one of the plurality of input elements with an alternative description if said means for determining indicates that said client is not capable of supporting said visual embodiment of said one of the plurality of input elements.

30. The system of claim 29, wherein said alternative description is a WML tag.

31. In a networked environment, a computer program product, recorded on a computer readable medium, for creating a document for delivery over the World-Wide Web, wherein the document contains a plurality of input elements requiring user interaction, comprising:

computer readable means for describing each of the plurality of input elements as a visual embodiment thereof;

computer readable means for describing each of the plurality of input elements as a logical purpose thereof.

32. The computer program product of claim 31, wherein said document is authored in an eXtensible Markup Language (XML) format.

33. The computer program product of claim 32, wherein said computer readable means for describing each of the plurality of input elements as a logical purpose thereof comprises computer readable means for describing each of the plurality of input elements as an attribute thereof.

34. The computer program product of claim 31, wherein said document is authored using the HyperText Markup Language (HTML).

35. The computer program product of claim 34, wherein said computer readable means for describing each of the plurality of input elements as a logical purpose thereof comprises computer readable means for describing each of the plurality of input elements as an attribute thereof.

36. The computer program product of claim 34, wherein said visual embodiment is of type "button".

37. The computer program product of claim 34, wherein said visual embodiment is of type "checkbox".

38. The computer program product of claim 34, wherein said visual embodiment is of type "radio".

39. The computer program product of claim 34, wherein said visual embodiment is of type "option".

40. The computer program product of claim 31, wherein said computer readable means for selecting an alternative embodiment comprises computer readable means for assessing said logical purpose of said one of the plurality of input elements and said user input capabilities of said client.

41. In a networked environment, a computer program product recorded on a computer readable medium for creating a document for delivery over the World-Wide Web, wherein the document contains a plurality of input elements requiring user interaction, comprising:

computer readable means for describing each of the plurality of input elements as a visual embodiment thereof; and computer readable means for describing each of the plurality of input elements as a logical embodiment thereof, wherein said document is authored in an eXtensible Markup Language (XML) format, wherein said computer readable means for describing each of the plurality of input elements as a logical embodiment thereof comprises computer readable means for describing each of the plurality of input elements as an attribute thereof, and wherein said attribute is named "Role".

42. In a networked environment a computer program product recorded on a computer readable medium for creating a document for delivery over the World-Wide Web, wherein the document contains a plurality of input elements requiring user interaction, comprising:

computer readable means for describing each of the plurality of input elements as a visual embodiment thereof; and computer readable means for describing each of the plurality of input elements as a logical embodiment thereof, wherein said document is authored using the hypertext markup language (HTML), wherein said computer readable means for describing each of the plurality of input elements as a logical embodiment thereof comprises computer readable for describing each of the plurality of input elements as an attribute thereof, and wherein said attribute is named "Role".

43. In a networked environment, a computer program product recorded on a computer readable medium for creating a document for delivery over the World-Wide Web, wherein the document contains a plurality of input elements requiring user interaction, comprising:

computer readable means for describing each of the plurality of input elements as a visual embodiment thereof, and computer readable means for describing each of the plurality of input elements as a logical embodiment thereof, wherein the document is received by a proxy server before being delivered to a Web browser that is executing on a client and wherein the processing of said document by said proxy server comprises:

computer readable means for selecting one of said input elements for processing;

computer readable means for evaluating the user input capabilities of said client;

computer readable means for determining whether said client is capable of supporting said visual embodiment of said one of said input elements;

computer readable means for deleting information about said logical embodiment of said one of said input elements from said document if said computer readable means for determining indicates that the client is capable of supporting said visual embodiment of said one of said input elements; and computer readable means for forwarding said document as modified by said computer readable means for deleting to said browser that is executing on a client.

44. The computer program product of claim 43, further comprising computer readable means for replacing a description of said one of the plurality of input elements with an alternative description if said computer readable means for determining indicates that said client is not capable of supporting said visual embodiment of said one of the plurality of input elements.

45. The computer program product of claim 44, wherein said alternative description is a WML tag.

46. A computer program product stored in a computer readable medium for interpreting a document, wherein the document contains a plurality of input elements requiring user interaction, the computer program product comprising:

first instructions for reading from the document a logical purpose for a first input element from the plurality of input elements; and second instructions for reading from the document a visual embodiment for the first input element.

47. The computer program product of claim 46, wherein the document is authored in an Extensible Markup Language (XML) format.

48. The computer program product of claim 46, wherein the first instructions comprise third instructions for reading the logical purpose as an attribute of the first input element.

49. The computer program product of claim 46, wherein the document is authored using the HyperText Markup Language (HTML).

50. The computer program product of claim 49, wherein the first instructions comprise third instructions for reading the logical purpose as an attribute of the first input element.

51. The computer program product of claim 50, wherein the visual embodiment is of type "button".

52. The computer program product of claim 50, wherein the visual embodiment is of type "checkbox".

53. The computer program product of claim 50, wherein the visual embodiment is of type "radio".

54. The computer program product of claim 50, wherein the visual embodiment is of type "option".

55. The computer program product of claim 46, wherein the sixth instructions comprise seventh instructions for assessing the logical purpose.

56. A computer program product stored in a computer readable medium for interpreting a document, wherein the document contains a plurality of input elements requiring user interaction, the computer program product comprising:

first instructions for reading from the document a logical purpose for a first input element from the plurality of input elements; and second instructions for reading from the document a visual embodiment for the first input element, wherein the document is authored in an eXtensible Markup Language (XML) format, wherein the first instructions comprise third instructions for reading the logical purpose as an attribute of the first input element, and wherein the attribute is named "Role".

57. A computer program product stored in a computer readable medium for interpreting a document, wherein the document contains a plurality of input elements requiring user interaction, the computer program product comprising:

first instructions for reading from the document a logical purpose for a first input element from the plurality of input elements; and second instructions for reading from the document a visual embodiment for the first input element, wherein the logical purpose is distinct from the visual embodiment, wherein the document is authored using the HyperText Markup Language (HTML), wherein the first instructions comprise third instructions for reading the logical purpose as an attribute of the first input element, and wherein the attribute is named "Role".

* * * * *

UNITED STATES PATENT AND TRADEMARK OFFICE
CERTIFICATE OF CORRECTION

PATENT NO.  : 6,446,096 B1
DATED       : September 3, 2002
INVENTOR(S) : Ian Michael Holland and Sandeep Kishan Singhal It is certified that error appears in the above-identified patent and that said Letters Patent is hereby corrected as shown below:

Column 9,
Lines 15-22, please delete claim 1 and replace with the following:

-- 1. In a networked environment, a method of creating a document for delivery over the World-Wide Web, wherein the document contains a plurality of input elements requiring user interaction, comprising the steps of:
describing each of the plurality of input elements as a visual embodiment thereof;
describing each of the plurality of input elements as a logical purpose thereof;
wherein the document is received by a Web browser that is executing on a client and further comprising the steps of:
processing the document by the Web browser, said step of processing comprising the steps of:
selecting one of the plurality of input elements for processing;
evaluating user input capabilities of said client;
determining whether said client is capable of supporting said visual embodiment of said one of the plurality of input elements;
selecting said visual embodiment of said one of the plurality of input elements; and
selecting an alternative embodiment if said step of determining indicates that said client is not capable of supporting said visual embodiment of said one of the plurality of input elements. --

Column 10,
Lines 36-43, please delete claim 16 and replace with the following:

-- 16. In a networked environment, a system for creating a document for delivery over the World-Wide Web, wherein the document contains a plurality of input elements requiring user interaction, comprising:
means for describing each of the plurality of input elements as a visual embodiment thereof;
means for describing each of the plurality of input elements as a logical purpose thereof;
wherein the document is received by a Web browser that is executing on a client and further comprising:
means for processing the document by the Web browser, said means for processing comprising:
means for selecting one of the plurality of input elements for processing;
means for evaluating user input capabilities of said client;
means for determining whether said client is capable of supporting said visual embodiment of said one of the plurality of input elements;
means for selecting said visual embodiment if said means for determining indicates that said client is capable of supporting said visual embodiment of said one of the plurality of input elements; and
means for selecting an alternative embodiment if said means for determining indicates that said client is not capable of supporting said visual embodiment of said one of the plurality of input elements. --

UNITED STATES PATENT AND TRADEMARK OFFICE
CERTIFICATE OF CORRECTION

PATENT NO. : 6,446,096 B1
DATED : September 3, 2002
INVENTOR(S) : Ian Michael Holland and Sandeep Kishan Singhal It is certified that error appears in the above-identified patent and that said Letters Patent is hereby corrected as shown below:

Column 12,
Lines 1-10, please delete claim 31 and replace with the following:

-- 31. In a networked environment, a computer program product, recorded on a computer readable medium, for creating a document for delivery over the World-Wide Web, wherein the document contains a plurality of input elements requiring user interation, comprising:
computer readable means for describing each of the plurality of input elements as a visual embodiment thereof;
computer readable means for describing each of the plurality of input elements as a logical purpose thereof;
wherein the document is received by a Web browser that is executing on a client and further comprising:
computer readable means for processing the document by the Web browser, said computer readable means for processing comprising:
computer readable means for selecting one of the plurality of input elements for processing;
computer readable means for evaluating user input capabilities of said client;
computer readable means for determining whether said client is capable of supporting said visual embodiment of said one of the plurality of input elements;
computer readable means for selecting said visual embodiment if said computer readable means for determining indicates that said client is capable of supporting said visual embodiment of said one of the plurality of input elements; and
computer readable means for selecting an alternative embodiment if said computer readable means for determining indicates that said client is not capable of supporting said visual embodiment of said one of the plurality of input elements. --

UNITED STATES PATENT AND TRADEMARK OFFICE
CERTIFICATE OF CORRECTION

PATENT NO. : 6,446,096 B1
DATED : September 3, 2002
INVENTOR(S) : Ian Michael Holland and Sandeep Kishan Singhal It is certified that error appears in the above-identified patent and that said Letters Patent is hereby corrected as shown below:

<u>Column 13, line 51 thru Column 14, line 2,</u>
Please delete claim 46 and replace with the following:

-- 46. A computer program product stored in a computer readable medium for interpreting a document, wherein the document contains a plurality of input elements requiring user interaction, the computer program product comprising:
    first instructions for reading from the document a logical purpose for a first input element from the plurality of input elements;
    second instructions for reading from the document a visual embodiment for the first input element;
    wherein the computer program product executed on a client further comprising:
    third instructions for evaluating user input capabilities of the client;
    fourth instructions for determining whether the client is capable of supporting the visual embodiment;
    fifth instructions for selecting the visual embodiment if the fourth instructions indicate that the client is capable of supporting the visual embodiment; and
    sixth instructions for selecting an alternative embodiment if the fourth instructions indicate that the client is not capable of supporting the visual embodiment. --

Signed and Sealed this

Fourteenth Day of December, 2004

JON W. DUDAS
*Director of the United States Patent and Trademark Office*